Feb. 13, 1945. P. H. BURMAN 2,369,335
IMMERSION GAUGE
Filed March 4, 1942

INVENTOR.
PAUL H. BURMAN.
BY
Allen & Allen
ATTORNEYS.

Patented Feb. 13, 1945

2,369,335

UNITED STATES PATENT OFFICE 2,369,335

IMMERSION GAUGE

Paul H. Burman, Glendale, Ohio

Application March 4, 1942, Serial No. 433,358

5 Claims. (Cl. 15—140.2)

My invention relates to an immersion gauge by which the depth to which an applicator or brush is inserted in a liquid is predetermined.

Primarily my invention relates to a gauge for the use of painters, and which is placed in the ordinary paint can or pail after it is opened, and which may be adjusted so that the painter dips his brush a predetermined depth while he is painting. This has the advantage of permitting the painter to dip his brush into the paint without carefully inspecting it to see that he does not dip the bristles too deep. The gauge is adjustable within the can so that it may be set for deep dipping for certain types of work and shallow dipping for other types of work.

A further object of my invention is to provide a dipping gauge which besides having the gauging advantages described above, permits a painter to leave his brush in the paint can, and which prevents the brush from sinking to the bottom of the can or sliding in to such a distance as to cover the handle or bristle-holding portion of the brush.

A further object of my invention is to provide an immersion gauge which has all of the above advantages but which, when placed in a pail of paint, leaves an aperture sufficiently large to insert a stick for stirring the paint. While I will describe my immersion gauge as a separate unit which is placed in the ordinary painter's can after the can is opened, it is to be understood that I also contemplate a gauge which may be built in a painter's can or pail as an integral part thereof.

These and other objects of my invention which will be set forth hereinafter or will be apparent to one skilled in the art upon reading these specifications, I accomplish by that certain construction and arrangement of parts of which I shall now describe an exemplary embodiment. Reference is now made to the drawing which forms a part thereof, and in which.

Briefly, in the practice of my invention I provide one or more upstanding racks which are placed in a painter's can and which support a horizontally disposed and vertically adjustable plate or baffle. Preferably, this plate or baffle covers less than the whole of a cross section of the interior of the can so as to permit the stirring of the paint with a stick.

Figure 1:
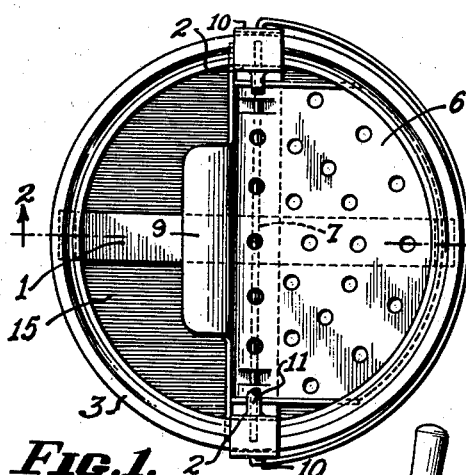
Figure 1 is a plan view of a form of my immersion gauge placed in a painter's can.
Figure 3:
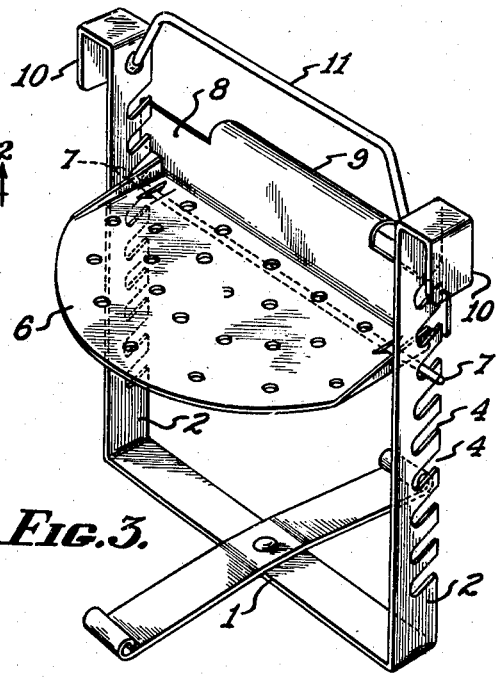
Figure 3 is a perspective view of the immersion gauge itself before it is placed in the can.
Figure 2:
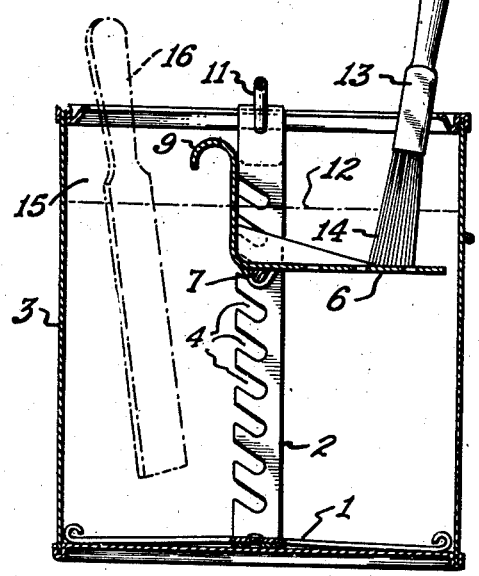
Figure 2 is a cross section of my immersion gauge shown in Figure 1, and taken along the section line 2—2 of Figure 1.

Referring to the drawing, the embodiment shown in Figures 1, 2, and 3 consists of a base 1 with two upstanding racks 2. The racks 2 are spaced apart so that they will fit snugly within the interior of a painter's can 3. There is a series of vertically arranged slots 4 in the racks 2 which are oppositely disposed. The abutment or gauge 6 is preferably foraminated, and in the embodiment described consists of a substantially semicircular plate having pintles 7 projecting from both sides. The pintles 7 are placed in oppositely opposed slots of the rack 2, and an upstanding portion 8 integral with the portion 6 abuts against the side of the rack 2 and holds the plate 6 in a horizontal plane. The terminal portion of the upstanding portion 8 is preferably curved over to form a handle 9 which assists in the adjustment of the plate 6 within the can.

In the embodiment described the racks 2 terminate in hooks 10 which fit over the lip of the can 3 as is apparent from Figure 1. In order to strengthen this construction I provide a bar 11 which runs between the two racks and insures their remaining in position, and is also of assistance in removing the structure itself from the paint can.

As is apparent from Figure 2, my device is placed in the can 3 with the base 1 resting upon the bottom of the can and abutting the wall and the hooks 10 hooked over the lip or rim of the can. The size of the construction is such that the two racks 2 are oppositely disposed on the interior diameter of the can.

Referring to Figure 2, the level of the paint or liquid in the can is indicated at 12, and the baffle or abutting plate 6 is so adjusted by means of the pintle 7 and slots 4 as to place the baffle 6 some predetermined distance below the surface 12 of the liquid. From this it is apparent that when the brush 13 is dipped into the paint the bristles 14 will contact the abutment 6 and the length of bristles dipped into the paint will be predetermined by the distance the baffle 6 is below the surface 12. It is also apparent that the painter may leave his brush in the can as in Figure 2, and that the brush will not sink to the bottom of the can because of the baffle 6. Inasmuch as the baffle 6 covers less than the total cross sectional interior of the can, there is a space 15 sufficiently large to permit the insertion of a stirring paddle 16 completely to the bottom of the can for stirring the paint.

Figure 5:
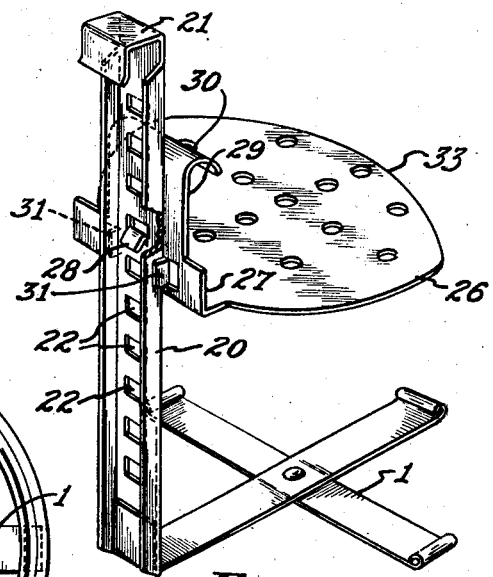
Figure 5 is a perspective view of the gauge illustrated in Figure 4.
Figure 4:
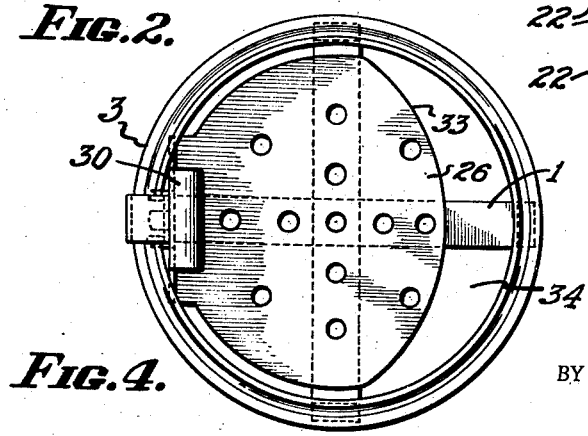
Figure 4 is a plan view of a modified immersion gauge placed in a painter's can.

In the modification illustrated in Figures 4 and 5, I provide a base 1 with a single upstanding rack 20 terminated by a hook 21 which fits over the lip of the can, as is clear from Figure 4. There is a number of vertically arranged slots 22 in the rack 20. In this instance my baffle or abutment 26 is bent up as at 27 at the portion which contacts the rack 20. A finger 28 of a size which will fit through the slots 22, is provided together with an upstanding portion 29 which terminates in a hook handle 30, and also abuts the surface of the rack 20 so as to insure the plate 26 remaining horizontal. In order to strengthen the rack 20 I preferably make it channel-shaped as is clear from Figure 5; and in order to prevent misplacing of the plate 26 I provide brackets 31 which embrace the side of the rack 20 as is clear from Figure 5.

In the modification shown in Figures 4 and 5, the plate 26 has a portion 33 cut off so as to leave a space 34 between the sides of the can and the plate 26 to permit the insertion of a stirring paddle. While I have shown the space 34 as crescent shaped, it of course should be understood that this space may be any shape so long as it is sufficiently large to permit the insertion of a stirring paddle. In this modification the rack is removable from the can, but it should be understood that the rack 20 may be made a part of the can itself, thus obviating the necessity of the base 1.

In using my invention it is apparent that the plate 6 in the one modification, and 26 in the other, is readjusted and moved down as the paint in the can is used up, so that the distance a brush may be dipped may be varied or may remain constant during the use of the liquid or paint in the can.

It is to be understood that different forms of my preferred form may be made without departing from the spirit of my invention.

Having thus described my invention, what I claim as new and desire to secure by Letters Patent is:

1. An applicator abutment and gauge adapted for use within a liquid container, comprising two upstanding oppositely opposed racks, a series of slots in said racks, a plate having projecting pintles positioned between said racks and supported by said pintles projecting into oppositely disposed slots, means on said plate contacting said racks for maintaining said plate in a horizontal position, and a handle on said plate for removing the same from said racks and selectively adjusting said plate on said racks by inserting said pintles in a different set of oppositely disposed slots.

2. An applicator abutment and gauge adapted for use within a liquid container, comprising two upstanding oppositely opposed racks, a series of slots in said racks, a plate having projecting pintles positioned between said racks and supported by said pintles projecting into oppositely disposed slots, means on said plate contacting said racks for maintaining said plate in a horizontal position, and a handle on said plate for removing the same from said racks and selectively adjusting said plate on said racks by inserting said pintles in a different set of oppositely disposed slots, said plate being substantially semicircular in form.

3. A painter's can containing a flat horizontal vertically adjustable brush bristle abutment for gauging the dip of a brush into the liquid contained in the can, said abutment covering at least one-half but substantially less than the whole cross-sectional interior of the can.

4. An applicator abutment adapted for use within a liquid container, comprising at least one upstanding rack having a rearwardly projecting hook at one end and a forwardly projecting base at the other end, a flat horizontal plate mounted on said rack and projecting over at least a portion of said base, said plate having an upwardly projecting handle and being vertically adjustable up and down said rack and removed therefrom by means of said handle.

5. In combination with a liquid container, an applicator abutment within said container and comprising at least one upstanding rack terminated by a hook embracing the lip of the container, a flat horizontal plate having an upstanding handle mounted on said rack, said plate being vertically adjustable up and down said rack by said handle.

PAUL H. BURMAN.